United States Patent [19]
Ito et al.

[11] Patent Number: 4,716,087
[45] Date of Patent: Dec. 29, 1987

[54] PLATINUM-COPPER ALLOY ELECTROCATALYST AND ACID-ELECTROLYTE FUEL CELL ELECTRODE USING THE SAME

[75] Inventors: Takashi Ito, Ichikawa; Shigemitsu Matsuzawa, Edogawa; Katsuaki Kato, Ichikawa, all of Japan

[73] Assignee: Nippon Engelhard Ltd., Tokyo, Japan

[21] Appl. No.: 940,246

[22] Filed: Dec. 10, 1986

[30] Foreign Application Priority Data

May 16, 1986 [JP] Japan .................................. 61-110911

[51] Int. Cl.⁴ ............................................. H01M 4/92
[52] U.S. Cl. ........................................ 429/40; 429/44; 420/466; 502/331
[58] Field of Search ........................ 429/40, 42, 44, 45; 502/331, 185, 177; 420/466, 469, 497

[56] References Cited

U.S. PATENT DOCUMENTS

| | | | |
|---|---|---|---|
| 3,585,253 | 6/1971 | Huang | 502/331 X |
| 3,617,518 | 11/1971 | Sinfelt et al. | 502/331 X |
| 4,137,372 | 1/1979 | Jalan et al. | 429/44 |
| 4,186,110 | 1/1980 | Jalan et al. | 429/44 X |
| 4,192,907 | 3/1980 | Jalan et al. | 429/44 X |
| 4,316,944 | 2/1982 | Landsman et al. | 429/44 |
| 4,447,506 | 5/1984 | Luczak et al. | 429/44 |
| 4,585,711 | 4/1986 | Vaidyanathan | 429/44 X |

FOREIGN PATENT DOCUMENTS 2460078 7/1975 Fed. Rep. of Germany ...... 502/331

Primary Examiner—Anthony Skapars
Attorney, Agent, or Firm—Watson, Cole, Grindle & Watson

[57] ABSTRACT

A platinum alloy electrocatalyst, composed of a platinum-copper alloy containing 15 to 50 atomic percent of copper (the balance being platinum) and supported on a suitable carrier, shows high activity over long periods because of the enhanced specific activity of supported metal and improved maintainability of its specific surface area. Thus acid-electrolyte fuel cells using the electrode comprising such an electrocatalyst feature better output performances and longer service life than fuel cells using conventional electrodes.

22 Claims, 1 Drawing Figure

● ---- CATHODE CATALYST C-2 (ELECTRODE E-2)
■ ---- CATHODE CATALYST C-1*(ELECTRODE E-1*)
▲ ---- CATHODE CATALYST C-9*(ELECTRODE E-9*)

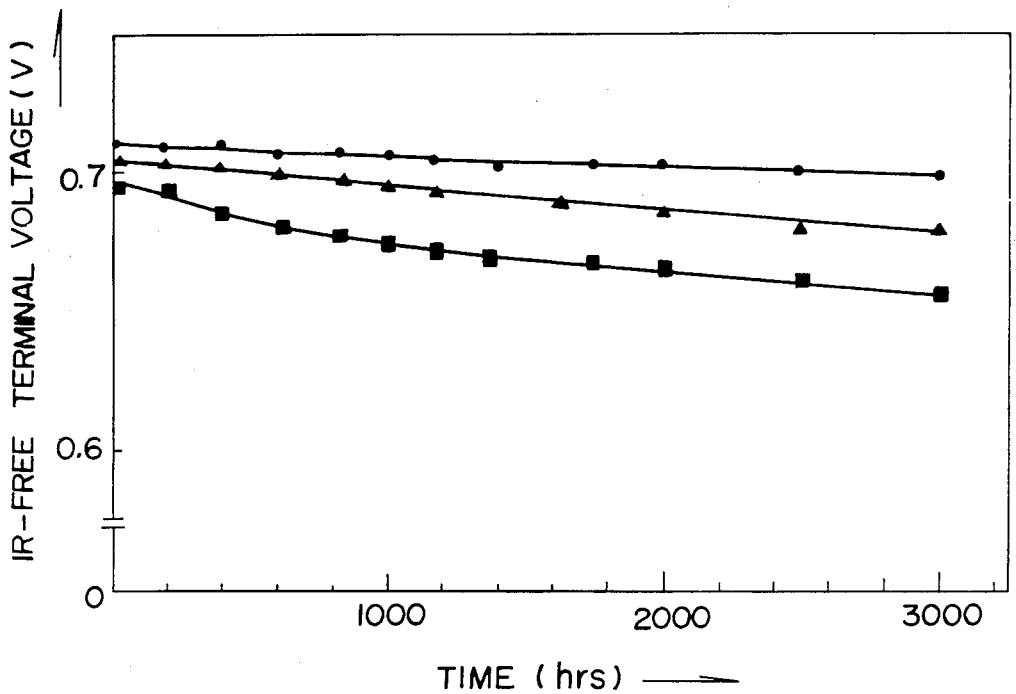

4,716,087

PLATINUM-COPPER ALLOY ELECTROCATALYST AND ACID-ELECTROLYTE FUEL CELL ELECTRODE USING THE SAME

BACKGROUND OF THE INVENTION

1. Technical Field

The present invention relates to platinum-copper alloy electrocatalysts and to acid-electrolyte fuel cell electrodes using the same.

2. Description of the Prior Art

The fuel cell is an electrochemical device for direct conversion of a fuel, such as hydrogen gas or hydrocarbons, and an oxidizing agent, such as oxygen gas, into a low-voltage direct current. It generally comprises a fuel electrode (anode), an oxidizer electrode (cathode), an electrolyte placed between the two electrodes, and a means to separately introduce fuel and oxidizer streams to the anode and to the cathode, respectively. Electrocatalysts are used in both the anode and cathode. In operation, the fuel, which is supplied to the anode and brought into contact with the electrocatalyst, is oxidized in the presence of the electrolyte, thereby liberating electrons. The oxidizing agent, on the other hand, is fed to the cathode, where it is reduced on the surface of the electrocatalyst in the presence of the electrolyte, thereby consuming the electrons transferred from the anode via an external circuit and generating electric power. Thus the electrocatalysts used in the anode and cathode play a very important role in a fuel cell; the output efficiency and service life of a fuel cell depend greatly upon the activity of the electrocatalysts used.

It is known that, of the Group-8, Group-9 and Group-10 metals of the Periodic Table (according to the nomenclature recommended by IUPAC in November, 1983), the "platinum group metals" (Pt, Pd, Rh, Ru, Ir and Os) can be advantageously used, either alone or in combination, as the electrocatalyst. It is common practice that such a platinum group metal, or a combination thereof, is supported on a conductive carrier material, such as conductive carbon black, in a well dispersed form, and the catalyst thus obtained is fixed to a support member, such as a metal screen (made of, for example, nickel or tantalum) or waterproof graphite paper, thus making up an electrode.

It is also known that in oxygen/hydrogen feed phosphoric acid fuel cells, in particular, the activation polarization of oxygen reduction at the cathode is far greater in magnitude than that of hydrogen oxidation at the anode. When a supported platinum-group metal mentioned above is used as a cathode, the activity of the catalyst tends to gradually decline, leading to a lowering in the output and overall operation efficiency of the cell. Presumably, the crystallites of the supported platinum-group metal on the catalyst tend to be dissolved out into the electrolyte, or to grow into large particles as a result of sintering during cell operation by the action of oxygen and electrolyte held at about 200° C., thereby decreasing the specific surface area of the active metal and resulting in the decline in the catalyst activity.

Assiduous studies have recently been conducted with respect to the development of the phosphoric acid fuel cell, but it is generally accepted that, in order for this type of fuel cell to come into widespread use as a power generating system, it must be able to continue operation over a period of more than 40,000 hours at a power output above a certain level. This requirement cannot be met so long as an electrode comprising a platinum-metal catalyst as mentioned above is used.

Thus there has been a demand for new platinum-based catalysts which will maintain higher activity over longer periods. To this end, it would be important to enhance the specific activity of the supported metal (activity per unit surface area of supported metal), and also to enhance the maintainability of its specific surface area (surface area per unit weight of supported metal).

Many studies have so far been made on supported metal catalysts with higher specific activity. These include alloys of a platinum group metal with various other metals, primarily Group 2 to 6 base metals such as vanadium, tungsten, aluminum, titanium, silicon, cerium, strontium and chromium (U.S. Pat. No. 4,186,110, No. 4,202,934 and No. 4,316,944); ternary alloys prepared by adding cobalt to platinum-vanadium or platinum-chromium alloys (U.S. Pat. No. 4,447,506); alloys of a platinum group metal with gallium, or superlattice alloys between a platinum group metal and iron (Japanese Patent Application Laid-open No. 7941 and No. 156551 (1985)); and ternary alloys prepared by adding cobalt and nickel to platinum (Japanese Patent Application Laid-open No. 8851 (1986)). These alloys show enhanced specific activity, but little improvement can be achieved in the maintainability of specific surface area.

As stated above, the decrease in the specific surface area of supported metal is caused by sintering of the metal particles or their dissolution into the electrolyte. Several techniques have been proposed to prevent this difficulty. These include a method in which the supported metal is treated with a carbon-containing substance, such as carbon monoxide and hydrocarbon gases, followed by calcination in an inert gas atmosphere, thereby forming carbon film over the supported metal particles and the surrounding areas (U.S. Pat. No. 4,137,372); a process in which the active metal is supported on a carrier made of a non-conductive material, and the supported metal thus prepared is mixed with powder of conductive carbon to make up an electrocatalyst (a process based on the concept that the sintering of supported metal particles is caused by electrochemical corrosion due to conductivity of the carrier) (Japanese Patent Application Laid-open No. 212961 (1985)); and a method of making the supported active metal less wettable to the corrosive electrolyte by increasing the amount of waterproof polymer added to the catalyst layer in order to enhance the gas diffusivity of electrode. None of these methods, however, is satisfactory in enhancing the specific activity of the supported metal, although some improvement is observed in the maintainability of its specific surface area.

As described above, conventional fuel cell electrocatalysts fail to maintain high activity over long periods because of the low maintainability of specific activity and/or specific surface area of supported metal, and therefore fuel cells using such an electrocatalyst are not satisfactory in output power and service life.

SUMMARY OF THE INVENTION

Thus the object of the present invention is to provide stable and highly active electrocatalysts with higher specific activity and improved specific surface-area maintainability of supported metal, and to provide fuel cell electrodes using such a new electrocatalyst. We have found that this object can be achieved by an electrocatalyst composed of a platinum-copper (Pt-Cu) alloy comprising 50 to 85 atomic percent of platinum (Pt) and 15 to 50 atomic percent of copper (Cu) supported on a conductive carrier in a well dispersed form, and by an electrode composed of such a platinum-copper alloy electrocatalyst and a conductive, acid-resistant support member that supports the electrocatalyst.

DETAILED DESCRIPTION OF THE INVENTION

The platinum alloy electrocatalyst of the present invention is composed of a Pt-Cu binary alloy and a carrier that supports platinum alloy, in which binary alloy contains 15 to 50 atomic percent of copper, the balance being platinum. If the content of copper in the binary alloy is less than 15 atomic percent, the effect of added copper in enhancing the specific activity of supported metal and in improving the maintainability of its specific surface area is not sufficient, and the performances of resultant catalysts are practically the same as those of platinum catalyst containing no copper. If the content of copper exceeds 50 atomic percent, the resulting catalysts barely show performances comparable to those of catalysts comprising conventional binary or ternary alloys. The activity of a catalyst depends chiefly on the specific activity of the supported metal and its specific surface area, with the same amount of metal supported on carrier. Therefore it is generally preferable that the active metal be dispersed as finely as possible on the carrier so as to give a sufficiently large specific surface area. In the electrocatalysts of the present invention, in particular, the Pt-Cu alloy should preferably be supported on a carrier in such a finely dispersed form that it has a specific surface area of 30 m$^2$/g or larger, most preferably 60 m$^2$/g or larger. If the specific surface area is less than 30 m$^2$/g, the resulting alloy has a low cost performance because of the low catalytic activity per unit weight.

There is no specific limitation upon the type of conductive support material used for the electrocatalysts of the present invention, but conductive carbonaceous materials (e.g., conductive carbon black, acetylene black and graphite) and metal carbides (e.g., tungsten carbide), are particularly advantageous. Illustrative examples include commercial carbon blacks, such as Vulcan XC-72R and XC-72 (products of Cabot Corp.) and Conductex 975 (product of Columbian Chemicals Co.), and commercial acetylene blacks such as Shawinigan Black (product of Gulf Oil Corp.). Of these, Vulcan XC-72 and Conductex 975 should preferably be heat-treated in vacuum or in an inert gas atmosphere before use to effect partial graphitization, thereby enhancing the corrosion resistance required of an electrocatalyst carrier which is to be placed in service under the operating conditions where a high-temperature electrolyte and oxidizer exist. These carrier materials generally have a specific surface area (BET) of about 60 to 250 m$^2$/g and a particle size of about 0.1 to 50 microns. In addition, these materials must be electro-conductive in order to serve as a carrier for electrocatalysts, and their electrical resistivity should preferably be 100 Ωcm or less, most preferably, 0.3 Ωcm or less.

In the electrocatalysts of the present invention as described above, the amount of the supported Pt-Cu alloy is normally in the range from 0.1 to 30%, based on the total weight of catalyst, preferably in the range from 5 to 15%. If the alloy loading exceeds 30 weight %, it will be less dispersed, making it difficult to expect an improvement in catalyst performances proportionate to the increase in the loading. The result is lowered cost-effectiveness for the use of carrier. If the loading of alloy is excessively low, on the other hand, the activity per unit weight of catalyst will be lower because there is an upper limit for the degree of alloy dispersion.

The Pt-Cu alloy electrocatalysts of the present invention may be prepared, for example, according to the procedures given below.

A powdery carrier material, such as conductive carbon black, is brought into contact with an aqueous solution or dispersion (slurry) containing the compounds of individual alloy components to allow each compound to be impregnated in, or adsorbed on, the carrier material. The metal compounds are then reduced to corresponding metals by heat treatment in the presence of a suitable reducing agent. As the compound containing platinum, bivalent or tetravalent chloroplatinic acid, bivalent or tetravalent chloroplatinate, or solubilized H$_2$Pt(OH)$_6$ can be used. Cuprous chloride, cupric chloride, cuprous nitrate, cupric nitrate, cuprous sulfate and cupric sulfate may be mentioned as examples of the copper compounds. These metal compounds may be deposited on the carrier material by using a solution or dispersion containing the two types of metal compounds (the so-called two-component simultaneous deposition process). Alternatively, platinum is first deposited from a solution thereof onto the carrier, followed by deposition of Cu from a solution thereof onto the carrier and supported platinum on it (the so-called stepwise deposition process).

For the feasibility of controlling the loading amount of copper and platinum, the stepwise deposition process is preferable to the simultaneous deposition process.

The catalyst precursor containing platinum and copper thus deposited on the carrier in the form of metal or compound are then heated in a reducing atmosphere to effect alloying of supported Pt and Cu. The temperature and time needed for this alloying depend primarily upon the particle size and dispersion degree of the component metals or their compounds on the carrier material prior to alloying operation. Alloying proceeds to a considerable extent even at about 600° C. when fine particles are evenly dispersed, but a temperature of some 900° C. is generally necessary to ensure complete alloying.

Alloying platinum with another metal generally causes a change in its lattice constant, which can be detected by a shift of diffraction peaks in X-ray diffraction analysis. When platinum is alloyed with copper in the process of this invention, its face-centered cubic lattice constant d=3.923 Å is shifted toward the face-centered cubic lattice constant of copper d=3.615 Å by a magnitude determined by the particular composition. The Pt-Cu alloys of the present invention have a lattice constant d in the range from 3.77 to 3.89 Å, if desirably alloyed.

Acid-electrolyte fuel cell electrodes of the present invention using such platinum-alloy electrocatalysts are detailed below.

The fuel cell electrodes of the present invention are composed of a Pt-Cu alloy catalyst fixed to a conductive and acid-resistant support member, such as a metal screen (i.g., tantalum or nickel) or waterproof graphite paper, by using an acid-resistant, waterproof binder, such as polytetrafluoroethylene, polyfluoroethylene-propylene or trifluoroalkoxypolyethylene, and are useful particularly as cathodes for acid electrolyte fuel cells (especially phosphoric acid fuel cells).

The above-mentioned binders serve not only to bond the catalyst to the support member, but to make the electrode permeable to feed gases, such as hydrogen and oxygen, in the electrolyte, thus forming a gas-liquid-solid ternary interface.

The electrodes of the present invention may be fabricated according to the procedures given below.

A Pt-Cu alloy catalyst of the present invention is mixed with a suspension of polytetrafluoroethylene (commercially available from DuPont under the tradename of Teflon) or other binder made of an acid-resistant polymer, giving a homogeneous suspension. This catalyst-binder suspension is then deposited, by the filtration-suction process or by spraying, on a support member previously waterproofed with the same acid-resistant polymer as above, followed by sintering in air.

It is advisable that the Pt-Cu alloy be provided on the electrode support member in an catalytically effective amount—normally in the range from about 0.1 to 2 mg per square centimeter of geometrical surface area of that support member, preferably in the range from about 0.2 to 1 mg/cm$^2$, more preferably in the range from about 0.4 to 0.8 mg/cm$^2$.

The electrodes of the present invention thus prepared are suitable for use in acid electrolyte fuel cells. The acid electrolytes used in these fuel cells include, other than phosphoric acid, sulfuric, hydrochloric, and superacids such as trifluoromethane-sulfonic, difluoromethane disulfonic acids, or mixtures thereof.

The Pt-Cu alloy electrocatalysts of the present invention show high activity over long periods because of the enhanced specific activity of supported metal and improved maintainability of its specific surface area. Acid electrolyte fuel cells using the electrode of the present invention (composed of such an electrocatalyst and a support member) feature excellent output performance and long service life.

BRIEF DESCRIPTION OF THE FIGURE

The FIGURE shows the change in terminal voltage with time observed in single cells using, as cathode, an electrode of the present invention or conventional electrodes.

(EXAMPLES)

The following Examples further illustrate the invention, in which the specific surface area of supported metal is the electrochemical metal surface area obtained by measuring the electrical charge corresponding to the process of hydrogen adsorption on metal surface in the cathodic sweep in cyclic voltametry.

PREPARATIVE EXAMPLE 1

Preparation of Supported Pt Catalyst

Eighty-one grams of heat-treated, conductive carbon black (Cabot Corp.; Vulcan XC-72R) having a specific surface area of 110 m$^2$/g was slurried in 1500 ml deionized water containing 4.0 g glacial acetic acid. Separately, H$_2$Pt(OH)$_6$ (9.0 g as Pt) was solubilized in 600 ml deionized water by the aid of an amine. This platinum solution was added to the slurry of carbon black prepared above with stirring, and the resulting mixture was gradually heated to about 95° C. while slowly adding 50 g of 5% formic acid as a reducing agent. After being maintained at that temperature for 30 minutes, the mixture was allowed to cool to room temperature and filtered, and the solid collected was washed with deionized water and dried at 95° C. for 16 hours in a nitrogen gas stream. The carbon-supported platinum catalyst containing 10 weight % platinum thus prepared (C-1*) (mark * indicates comparative example) had a metal specific surface area of 120 m$^2$/g.

PREPARATIVE EXAMPLE 2

Preparation of Supported Pt-Cu Catalyst

Fifth grams of the supported platinum catalyst obtained in Preparative Example 1 (C-1*) was dispersed in 1000 ml deionized water, and to this slurry was added 150 ml of an aqueous solution containing cupric nitrate (0.80 g as Cu) with vigorous stirring. After adjusting the pH to 8.0 by slowly adding a dilute aqueous solution of hydrazine, stirring was continued for an additional one hour to deposit reduced chemical species of Cu on the supported platinum catalyst, the resulting slurry was filtered, and the solid collected was dried at 95° C. in a nitrogen atmosphere and then heat-treated at 900° C. for one hour under a 7 volume-% hydrogen gas (the balance being nitrogen) stream, affording a carbon-supported Pt-Cu alloy catalyst (C-2) (atomic ratio; 2:1).

The formation of a binary Pt-Cu alloy was confirmed by X-ray diffraction analysis, which indicated a shift of face-centered cubic lattice constant d from 3.923 Å for platinum (C-1*) to 3.836 Å for Pt-Cu (C-2). This X-ray diffraction analysis also showed that the crystallite size of supported Pt-Cu alloy was 35 Å. Observation by a high-resolution scanning transmission electron microscope combined with an energy dispersive X-ray analyzer revealed that the platinum: copper atomic ratio in the alloy particles was 2:1.

PREPARATIVE EXAMPLE 3

Preparation of Supported Pt-Cu Catalysts

Pt-Cu alloy catalysts (C-3, C-4 and C-5) having Pt:Cu atomic ratios of 1:1, 3:2 and 4:1, respectively, were prepared in the same manner as in Preparative Example 2 by using varying loading amounts of cupric nitrate. The lattice constants of supported alloy crystallites of these catalysts were d=3.794, 3.817 and 3.876 Å, respectively.

PREPARATIVE EXAMPLE 4

Preparation of Supported Pt-Cu Catalysts

Pt-Cu alloy catalysts (C-6*, C-7* and C-8*) having Pt:Cu atomic ratios of 1:3, 2:3 and 10:1, respectively, were prepared in the same manner as in Preparative Example 2 by using varying loading amounts of cupric nitrate. The lattice constants of supported alloy crystallites of these catalysts were d=3.729, 3.756 and 3.912 Å, respectively.

PREPARATIVE EXAMPLE 5

Preparation of Supported Pt-Fe Catalyst

A supported Pt-Fe alloy catalyst (C-9*) was prepared in the same manner as in Preparative Example 2, except that 150 ml of an aqueous solution containing ferric nitrate (0.72 g as Fe) was used in place of the acqueous solution of cupric nitrate to deposit iron (Fe) in place of copper. The formation of Pt$_3$Fe superlattice alloy having a crystallite size of 33 Å and a lattice constant d=3.866 Å was confirmed by X-ray diffraction analysis.

PREPARATIVE EXAMPLE 6

Preparation of Supported Pt-Cr Catalyst

A supported Pt-Cr alloy catalyst (C-10*) was prepared in the same manner as in Preparative Example 2, except that an aqueous solution containing chromic(III) nitrate (0.73 g as Cr) was used in place of the aqueous solution of cupric nitrate to deposit chromium (Cr) in place of copper. The formation of a Pt-Cr alloy having a crystalline size of 35 Å and a lattice constant d=3.866 Å was confirmed by X-ray diffraction analysis.

PREPARATIVE EXAMPLE 7

Preparation of Supported Pt-Cr-Co Catalyst

A supported Pt-Cr-Co alloy catalyst (C-11*) was prepared in the same manner as in Preparative Example 2, except that an aqueous solution containing chromic-(III) nitrate (0.73 g as Cr) and cobaltous nitrate (0.79 g as Co) was used in place of the aqueous solution of cupric nitrate to simultaneously deposit chromium and cobalt in place of copper. The formation of a Pt-Cr-Co alloy having a crystallite size of 36 Å and a lattice constant d=3.827 Å was confirmed by X-ray diffraction analysis.

PREPARATIVE EXAMPLE 8

Preparation of Supported Pt-Co-Ni Catalyst

A supported Pt-Co-Ni alloy catalyst (C-12*) was prepared in the same manner as in Preparative Example 2, except that an aqueous solution containing and cobaltous nitrate (0.79 g as Co) and nickel(II) nitrate (0.79 g as Ni) was used in place of the aqueous solution of cupric nitrate to simultaneously deposit cobalt and nickel in place of copper. The formation of a Pt-Co-Ni alloy having a crystallite size of 32 Å and a lattice constant d=3.789 Å was confirmed by X-ray diffraction analysis.

EXAMPLES 1 THROUGH 4 AND COMPARATIVE EXAMPLES 1 THROUGH 8

(Electrode Fabrication)

Each of the catalysts obtained in Preparative Examples 1 through 8 (C-1*, C-2 through C-5, C-6* through C-12*) was dispersed in an aqueous suspension of polytetrafluoroethylene (DuPont; Teflon ® TFE-30) by ultrasonic blending. Aluminum trichloride was added to the resulting suspension to cause precipitation of cotton-like floc, which contained 50 weight % of catalyst and 50 weight % of polytetrafluoroethylene on dry basis. This floc was spread on a support member, made of graphite paper previously waterproofed with polytetrafluoroethylene, dried after pressing, and sintered in air at 350° C. for 15 minutes, giving an electrode with a metal (Pt or Pt alloy) loading of 0.50 mg/cm$^2$ electrode area. The electrodes thus prepared from catalysts C-1*, C-2 through C-5, and C-6* through C-12* were named E-1*, E-2 through E-5, and E-6* through E-12*, respectively.

I. Air-electrode Half Cell Testing

Air-electrode half cell characteristics of E-1*, E-2 through E-5 and E-6* through E-12* at 200° C. were measured using 105% phosphoric acid as electrolyte while introducing air at a rate of 600 ml/min. Table 1 shows the IR-free, half-cell potentials (v.s. reversible hydrogen electrode) at a current density of 200 mA/cm$^2$. As can be seen from the table, electrodes E-2, E-3, E-4 and E-5, which employ the Pt-Cu alloy catalysts of the present invention containing 15 to 50 atomic percent of copper (the balance being platinum), showed at least 42 mV higher potentials, compared with electrode E-1* using a catalyst made of platinum alone. These also showed at least 8 mV higher potentials, compared with electrode E-9* using a Pt-Fe alloy catalyst, electrode E-10* using a Pt-Cr alloy catalyst, and electrodes E-11* and E-12* using ternary Pt-Cr-Co and Pt-Co-Ni alloy catalysts. This clearly indicates that the higher oxygen reduction activity of the electrocatalysts of the present invention. Electrodes E-6* and E-7* which employ Pt-Cu alloy catalysts containing more than 50 atomic percent of copper, and electrode E-8* which employs a Pt-Cu alloy catalyst containing less than 15 atomic percent of copper, showed no significant improvement in half-cell potential, compared with electrodes using conventional binary or ternary alloy catalysts.

TABLE 1

| | Electrode No. | Supported Metal in Catalyst** | Catalyst No. | Alloy Composition (atom %) | Lattice Constant of Supported Metal (Å) | Half-cell Potential (mV) (IR-free) 200° C., 200 mA/cm$^2$ |
|---|---|---|---|---|---|---|
| Example | | | | | | |
| 1 | E-2 | Pt—Cu | (C-2) | 67:33 | 3.836 | 785 |
| 2 | E-3 | Pt—Cu | (C-3) | 50:50 | 3.794 | 788 |
| 3 | E-4 | Pt—Cu | (C-4) | 60:40 | 3.817 | 784 |
| 4 | E-5 | Pt—Cu | (C-5) | 80:20 | 3.876 | 782 |
| Comp. Ex. | | | | | | |
| 1 | E-1* | Pt | (C-1*) | — | 3.923 | 740 |
| 2 | E-6* | Pt—Cu | (C-6*) | 25:75 | 3.729 | 746 |
| 3 | E-7* | Pt—Cu | (C-7*) | 40:60 | 3.756 | 768 |
| 4 | E-8* | Pt—Cu | (C-8*) | 91:9 | 3.912 | 752 |
| 5 | E-9* | Pt—Fe | (C-9*) | 67:33 | 3.866 | 760 |
| 6 | E-10* | Pt—Cr | (C-10*) | 67:33 | 3.866 | 754 |
| 7 | E-11* | Pt—Cr—Co | (C-11*) | 50:25:25 | 3.827 | 762 |
| 8 | E-12* | Pt—Co—Ni | (C-12*) | 50:25:25 | 3.789 | 774 |

**Carbon black is used as carrier in all cases.

II. Testing on Specific Activity of Supported Metal for Oxygen Reduction

Oxygen-electrode half cell performances of E-1*, E-2, and E-9* through E-12* at 200° C. were measured using 105% phosphoric acid as electrolyte while introducing oxygen gas at a rate of 600 ml/min, and the specific activity of the supported metal in each catalyst for oxygen reduction at 900 mV ($\mu$A/cm$^2$ metal) was determined by using the IR-free polarization curve. The result is sumarized in Table 2. As can be seen from the table, electrode E-2 of the present invention using a Pt-Cu alloy catalyst showed a specific activity about three times as high as that of electrode E-1* employing a catalyst made of platinum alone and a specific activity at least 20% higher, compared with electrodes E-9* or E-10* using other types of binary alloys and electrodes E-11* or E-12* using ternary alloys. The specific surface area of supported metal in each of the electrodes is also shown in Table 2 for reference.

TABLE 2

| Electrode | Supported Metal in Catalyst** | Specific Surface Area of Supported Metal ($m^2$/g-metal) | Specific Activity for $O_2$ Reduction (900 mV) ($\mu A/cm^2$-metal) |
|---|---|---|---|
| E-2 | Pt—Cu | 82 | 108 |
| E-1* | Pt | 120 | 33 |
| E-9* | Pt—Fe | 81 | 79 |
| E-10* | Pt—Cr | 96 | 63 |
| E-11* | Pt—Cr—Co | 77 | 83 |
| E-12* | Pt—Co—Ni | 88 | 90 |

**Carbon black is used as carrier in all cases.

III. Accelerated Aging Test of Electrodes

Each of electrodes, E-1*, E-2 through E-5 and E-6* through E-12*, was immersed in 100 ml of 105% phosphoric acid placed in an accelerated aging cell, and held at 200° C. for 50 hours while loading a constant potential of +700 mV vs. the hydrogen reference electrode, under the atmosphere completely replaced with pure nitrogen gas stream. The specific surface area of the supported metal was measured before and after aging, and the retention of specific surface area was calculated. The result is summarized in Table 3. As is apparent from the table, it was demonstrated that, in the accelerated aging test for cathodes, electrodes E-2 through E-5 of the present invention showed clearly higher retention of specific surface area, compared with electrode E-1* using an electrode made of platinum alone, and even with electrodes E-9* through E-12* using catalysts made of the other binary or ternary alloys. When the composition of copper in Pt-Cu alloy exceeds 50 atomic percent (electrodes E-6* and E-7*), and when the composition of copper is less than 15 atomic percent (electrode E-8*), the retentions were not particularly good—levels nearly the same as those with conventional alloy catalysts.

TABLE 3

| Electrode | Supported Metal in Catalysts** | Specific Surface Area of Supported Metal ($m^2$/g-metal) Before Aging | After Aging | Retention of Specific Surface Area (%) |
|---|---|---|---|---|
| E-2 | Pt—Cu | 82 | 64 | 78 |
| E-3 | Pt—Cu | 98 | 71 | 72 |
| E-4 | Pt—Cu | 85 | 64 | 75 |
| E-5 | Pt—Cu | 92 | 74 | 80 |
| E-1* | Pt | 120 | 48 | 40 |
| E-6* | Pt—Cu | 93 | 64 | 69 |
| E-7* | Pt—Cu | 80 | 53 | 66 |
| E-8* | Pt—Cu | 93 | 58 | 62 |
| E-9* | Pt—Fe | 81 | 50 | 62 |
| E-10* | Pt—Cr | 96 | 55 | 57 |
| E-11* | Pt—Cr—Co | 77 | 51 | 66 |
| E-12* | Pt—Co—Ni | 88 | 56 | 64 |

*Carbon black is used as carrier in all cases.

IV. Single Cell Testing

Experimental fuel cells (single cells) were fabricated using electrode E-1* as anode and each of electrodes E-1*, E-2 and E-9* as cathode. Each cell was operated at 190° C. using 85% phosphoric acid as electrolyte at a current density of 160 mA/$cm^2$ while introducing hydrogen gas and air to the anode and cathode, respectively, and the change in terminal voltage (IR-free) was measured over a period of 3000 hours. The result is shown in FIG. 1. As may be apparent from the figure, electrode E-2 of the present invention gave a higher initial terminal voltage, compared with electrodes E-1* and E-9* (Comparative Examples). In addition, its decay rate, about 5 mV/1000 hr, was also considerably lower than those with electrodes E-1* and E-9*, about 15 mV/1000 hr and 10 mV/1000 hr, respectively. This indicates the better output performances and higher long-range stability of the fuel cell using electrode E-2.

V. Catalyst Stability Testing

Two grams of catalyst (C-2) was dispersed in 160 ml of 105% phosphoric acid, and the slurry thus obtained was held at 200±0.5° C. for five hours under an air stream while agitating with a stirring rod at a speed of 200 rpm. After cooling to room temperature, the slurry was diluted with deionized water and filtered, the solid residue was thoroughly washed with deionized water, and the concentration of platinum in the filtrate was analyzed to determine the dissolution loss of platinum. The particle size of supported metal left in the dried catalyst residue was determined by X-ray diffraction analysis. Similar tests were also conducted for catalysts, C-1*, C-3, C-9*, C-10*, C-11* and C-12*. These results are summarized in Table 4.

The test condition adopted in this test (stirring in hot phosphoric acid slurry saturated with air) is considered to be equivalent to a state in which the catalyst is at an electrochemical potential of about +0.95 V vs. hydrogen reference electrode. As can be seen from Table 4, the Pt-Cu alloy catalysts of the present invention (C-2 and C-3) have far higher stability in the presence of oxygen and hot phosphoric acid (less tendency of platinum being dissolved out into electrolyte or sintered into larger particles) compared with the Pt-Cr-Co alloy catalyst (C-11*) and the Pt-Co-Ni alloy catalyst (C-12*), not to mention the catalyst containing platinum alone (C-1*).

TABLE 4

| Catalyst | Supported Metal in Catalyst | Dissolution Loss of Pt in $H_3PO_4$ (wt %) | Metal Particle Size (Å) Before Test | After Test |
|---|---|---|---|---|
| C-2 | Pt—Cu | 1 | 35 | 35 |
| C-3 | Pt—Cu | 2 | 40 | 40 |
| C-1* | Pt | 30 | 23 | 110 |
| C-9* | Pt—Fe | 15 | 33 | 43 |
| C-10* | Pt—Cr | 8 | 35 | 48 |
| C-11* | Pt—Cr—Co | 5 | 36 | 37 |
| C-12* | Pt—Co—Ni | 3 | 32 | 42 |

What is claimed is:

1. A platinum-copper electrocatalyst comprising a carrier and a platinum-copper alloy supported in a well dispersed manner in said carrier, said platinum-copper alloy containing 15 to 50 atomic percent of copper and 85 to 50 atomic percent of platinum.

2. The electrocatalyst as defined in claim 1, wherein said carrier is a conductive material selected from the group consisting of carbon black, acetylene black, graphite and tungsten carbide.

3. The electrocatalyst as defined in claim 1, wherein the amount of said supported platinum-copper alloy is in the range from 0.1 to 30 percent, based on the total weight of said electrocatalyst.

4. The electrocatalyst as defined in claim 3, wherein the amount of said supported platinum-copper alloy is in the range from 5 to 15 percent, based on the total weight of said electrocatalyst.

5. The electrocatalyst as defined in claim 1, wherein said platinum-copper alloy has, in its supported form, a specific surface area of at least 30 m$^2$/g.

6. The electrocatalyst as defined in claim 5, wherein said platinum-copper alloy has, in its supported form, a specific surface area of at least 60 m$^2$/g.

7. The electrocatalyst as defined in claim 1, wherein said carrier has a specific surface area (BET) in the range from 60 to 250 m$^2$/g and a particle size in the range from 0.1 to 50 μm.

8. The electrocatalyst as defined in claim 1, wherein said carrier has an electrical resistivity of 100 Ωcm or lower.

9. The electrocatalyst as defined in claim 8, wherein said carrier has an electrical resistivity of 0.3 Ωcm or lower.

10. The electrocatalyst as defined in claim 1, wherein said platinum-copper alloy has been formed by reduction of a mixture of platinum and copper compounds.

11. The electrocatalyst as defined in claim 1, wherein said platinum-copper alloy has been formed by stepwise loading of platinum and copper compounds on the carrier, followed by reduction.

12. The electrocatalyst as defined in claim 10 or 11, wherein said platinum compound is one member selected from the group consisting of divalent chloroplatinic acid and salts thereof, tetravalent chloroplatininc acid and salts thereof, and solubilized $H_2Pt(OH)_6$.

13. The electrocatalyst as defined in claim 10 or 11, wherein said copper compound is one member selected from the group consisting of cuprous chloride, cupric chloride, cuprous nitrate, cupric nitrate, cuprous sulfate and cupric sulfate.

14. The electrocatalyst as defined in claim 1, wherein said platinum-copper alloy has a lattice constant d in the range from 3.77 Å to 3.89 Å.

15. An electrode for acid-electrolyte fuel cells comprising a conductive, acid-resistant support member and a platinum-copper alloy electrocatalyst supported on said support member, said platinum-copper alloy comprising a carrier and a platinum-copper alloy supported in a well dispersed manner on said carrier, said platinum-copper alloy containing 15 to 50 atomic percent of copper and 85 to 50 atomic percent of platinum.

16. The electrode as defined in claim 15, wherein said support member is a waterproof graphite paper or a conductive metal screen.

17. The electrode as defined in claim 16, wherein said conductive metal screen is made of tantalum or nickel.

18. The electrode as defined in claim 15, including an acid-resistant, waterproof binder which fixes said electrocatalyst to said support member.

19. The electrode as defined in claim 18, wherein said binder is a polymer selected from the group consisting of polytetrafluoroethylene, polyfluoroethylene-propylene and trifluoroalkoxypolyethylenes.

20. The electrode as defined in claim 15, wherein said platinum-copper alloy is dispersed on said support member at a concentration of 0.1 to 2 mg per square centimeter of geometric surface area.

21. The electrode as defined in claim 20, wherein said platinum-copper alloy is dispersed on said support member at a concentration of 0.2 to 1 mg per square centimeter of geometric surface area.

22. The electrode as defined in claim 21, wherein said platinum-copper alloy is dispersed on said support member at a concentration of 0.4 to 0.8 mg per square centimeter of geometric surface area.

* * * * *